US008319485B2

(12) United States Patent
Philpott

(10) Patent No.: US 8,319,485 B2
(45) Date of Patent: Nov. 27, 2012

(54) EXTENDING INPUT TO OUTPUT VOLTAGE RANGE IN MULTIPLE CHANNEL SWITCHING REGULATOR APPLICATIONS

(75) Inventor: Richard Neal Philpott, Discovery Bay, CA (US)

(73) Assignee: Linear Technology Corporation, Milpitas, CA (US)

(*) Notice: Subject to any disclaimer, the term of this patent is extended or adjusted under 35 U.S.C. 154(b) by 906 days.

(21) Appl. No.: 12/350,532

(22) Filed: Jan. 8, 2009

(65) Prior Publication Data

US 2010/0171476 A1 Jul. 8, 2010

(51) Int. Cl.
*G05F 1/40* (2006.01)
(52) U.S. Cl. ........................................ 323/282
(58) Field of Classification Search .................. 323/265, 323/268, 282–285, 349–351
See application file for complete search history.

(56) References Cited

U.S. PATENT DOCUMENTS

| 6,292,378 | B1* | 9/2001 | Brooks et al. ............... 363/65 |
| 6,819,011 | B2* | 11/2004 | Kernahan et al. .............. 307/35 |
| 7,068,485 | B2* | 6/2006 | Ishikawa et al. ............. 361/93.9 |
| 7,403,405 | B2* | 7/2008 | Conte et al. ............... 363/59 |
| 2004/0080886 | A1* | 4/2004 | Ishikawa et al. ............. 361/62 |
| 2008/0246453 | A1* | 10/2008 | Cagno et al. ............... 323/282 |

FOREIGN PATENT DOCUMENTS

EP 2209194 A2 * 7/2010
* cited by examiner

*Primary Examiner* — Adolf Berhane
(74) *Attorney, Agent, or Firm* — McDermott Will & Emery LLP

(57) ABSTRACT

Novel circuitry and methodology for operating a multiple channel switching regulator system to extend an input to output voltage ratio by setting individual constant switching frequencies to switching regulator channels. In the switching regulator system having at least first and second switching regulators, a first clock circuit supplies a first clock signal at a first clock frequency to define a switching frequency of one of the first and second switching regulators. A second clock circuit is synchronized to the first clock signal for producing a second clock signal at a second clock frequency different from the first clock frequency, to define a switching frequency of the other of the first and second switching regulators.

23 Claims, 6 Drawing Sheets

BACKGROUND

BACKGROUND

BACKGROUND

EXTENDING INPUT TO OUTPUT VOLTAGE RANGE IN MULTIPLE CHANNEL SWITCHING REGULATOR APPLICATIONS

TECHNICAL FIELD

This disclosure relates to power supply systems, and more particularly, to circuitry and methodology for increasing input to output voltage ratios in multiple channel switching regulator systems while maintaining constant synchronized switching frequencies in each channel.

BACKGROUND ART

A multiple channel switching regulator system includes multiple switching regulator channels, each of which is capable of converting from an input voltage above, below, or equal to the controlled output voltage, respectively performing buck mode regulation, boost mode regulation, or buck-boost mode regulation.

For example, a multiple channel switching regulator system may have a cascaded arrangement, in which the first switching regulator channel converts an input voltage into an intermediate voltage. The next switching regulator channel converts the intermediate voltage to the output voltage or to another intermediate voltage. Hence, the cascaded multiple channel arrangement performs multiple conversion steps to eliminate the need for a single converter that converts, for example, a very high input voltage into a very low output voltage. Each regulator in the cascaded multiple channel arrangement maintains a relatively low step-down or step-up ratio running at high efficiency while maintaining a reasonable duty cycle. By contrast, a regulator performing a single step conversion must run at a very narrow duty cycle compromising component size, efficiency and transient response.

Another example of a multiple channel switching regulator system is a multiple input arrangement capable of operating with multiple input power supply sources. Each switching regulator channel is supplied with a respective input voltage to produce the regulated output voltage that may be common for the system or individual for each channel.

Switching regulator channels in a typical multiple channel system operate at a constant switching frequency common for all channels. The constant switching frequency arrangement minimizes output ripple amplitude, and allows inductor and capacitor values to be chosen with a precise operating frequency in mind. Also, the constant frequency operation keeps noise generated by the system in a known frequency band.

FIG. 1 illustrates a typical step-down switching regulator channel 10 including a step-down switching regulator 12 that may include an internal switch controlled to provide voltage regulation, and switch control circuitry. External components connected to the step-down switching regulator 12 include an inductor L1 coupled to the input voltage VIN when the switch is on and disconnected from Vin when the switch is off. Also, the external components include a diode D1, such as a schottky diode, coupled to the inductor terminal to provide a path for the inductor current when the switch is off. A capacitor C1 and a diode D2 may be arranged to provide boosted drive for the switching regulator channel. A capacitor C2 may be coupled to the inductor terminal and charged when the switch is on. The current through the inductor ramps up when the switch is on, and ramps down when the switch is off. The size of the external components, along with the output voltage ripple, decreases with the increase in the switching frequency of the regulator. The maximum constant switching frequency of a non-synchronous step-down switching regulator can be approximated as follows:

$$fSW1(Hz) = \frac{VOUT + VD}{VIN - VSW + VD} \cdot \frac{1}{Ton(\min)}, \quad (1)$$

where VIN and VOUT are input and output voltages of the switching regulator channel,
VD is the forward voltage drop of the diode D1,
VSW is the voltage drop of the internal switch, and
Ton(min) is the minimum on time period of the regulator.

FIG. 2 illustrates a typical step-up switching regulator channel 20 including a step-up switching regulator 22 that may include an internal switch controlled to provide voltage regulation, and switch control circuitry. The step-up switching regulator 22 is connected to external components including an inductor L11, a diode D11 and a capacitor C11. When the switch is on, the input voltage VIN is forced across the inductor L11 causing the current through the inductor to ramp up. When the switch is off, the decreasing inductor current provides forward biasing of the diode D11 allowing the capacitor C11 to charge up to the output voltage VOUT.

The maximum constant switching frequency of a non-synchronous step-up switching regulator can be approximated as follows:

$$fSW2(Hz) = \left(1 - \frac{VOUT - VIN + VD}{VIN - VSW + VD}\right) \cdot \frac{1}{Toff(\min)}, \quad (2)$$

where VIN and VOUT are input and output voltages of the switching regulator,
VD is the forward voltage drop of the diode D1,
VSW is the voltage drop of the internal switch, and
Toff(min) is the minimum off time period of the regulator.

To minimize size of the external components and minimize the output voltage ripple, constant switching frequency of all channels in a typical multiple channel switching regulator system is determined by the maximum switching frequency of a channel having the lowest maximum switching frequency determined by the equations (1) and (2). This constraint determines the size of the external component for all channels.

FIG. 3 illustrates operation of an exemplary conventional 2-channel switching regulator operating at 1.5 MHz constant frequency, where channel 1 steps down a 24V input voltage to a 5V output voltage (VOUT1), and channel 2 steps down the 5V output voltage to a 1.8V output voltage (VOUT2). The diagram in FIG. 3 shows switch voltages SW1 and SW2 and output voltages Vout1 and Vout2 for channels 1 and 2, respectively. Due to the minimum on time restriction and high input to output voltage ratio on channel 1, 1.5 MhZ constant frequency operation cannot be maintained. To maintain output regulation, channel 1 switches to pulse skipping mode resulting in high output voltage ripple. To avoid pulse skipping mode and achieve the lowest possible output ripple, the overall system switching frequency must be reduced. To preserve the performance of the original system, external component values must be increased in the reduced frequency system which results in an increase in the overall system footprint. The alternative to reducing the system frequency is to limit the input to output voltage ratio of the switching regulator channels.

Therefore, there is a need for circuitry and methodology that would generate the smallest overall footprint for a multiple channel regulator system by achieving the highest possible constant frequency operation for each individual channel regardless of either channel or system input to output ratios, or other factors such as temperature which effect minimum on time restrictions of the individual channel.

SUMMARY OF THE DISCLOSURE

The present disclosure offers novel circuitry and methodology for operating a multiple channel switching regulator system to extend the input to output voltage ratio by setting individual constant synchronized switching frequencies for each switching regulator channel.

In accordance with one aspect of the disclosure, a power supply system having first and second switching regulators comprises a first clock circuit for supplying a first clock signal at a first clock frequency to define a switching frequency for one of the first and second switching regulators. A second clock circuit is responsive to the first clock signal for producing a second clock signal at a second clock frequency different from the first clock frequency, to define a switching frequency for the other of the first and second switching regulators.

The first switching regulator may be configured to operate at a constant first switching frequency, and the second switching regulator may be configured to operate at a constant second switching frequency different from the first switching frequency.

The power supply system may further comprise a third switching regulator for producing a third output signal in response to a third input signal, and a third clock circuit responsive to the first clock signal for producing a third clock frequency different from the first clock frequency, to define a switching frequency for the third switching regulator.

Inputs and outputs of the switching regulators may be connected in any desired manner. For example, the output signal of the first switching regulator may be supplied to an input of the second switching regulator.

Alternatively, the first switching regulator may be responsive to a first input signal to produce a first output signal, and the second switching regulator may be responsive to a second input signal independent of the first input signal and the first output signal, to produce a second output signal.

Also, the input of the first switching regulator may be coupled to the input of the second switching regulator.

Each switching regulator may have step-up, step-down or step-up/step-down topology. For example, in response to a first input signal, the first switching regulator may produce a first output signal higher than the first input signal, and in response to a second input signal, the second switching regulator may produce a second output signal higher than the second input signal.

Alternatively, in response to a first input signal, the first switching regulator may produces a first output signal higher than the first input signal, and in response to a second input signal, the second switching regulator may produce a second output signal lower than the second input signal.

Also, in response to a first input signal, the first switching regulator may produce a first output signal lower than the first input signal, and in response to a second input signal, the second switching regulator may produce a second output signal lower than the second input signal.

In accordance with one aspect of the disclosure, a ratio between the first and second clock frequencies may be statically set based on a pre-determined factor.

For example, the ratio between the first and second clock frequencies may be determined based on an input signal of a switching regulator supplied with the second clock signal.

Also, the ratio between the first and second clock frequencies may be determined based on an output signal of a switching regulator supplied with the second clock signal.

Moreover, the ratio between the first and second clock frequencies may be determined based on heating conditions.

In accordance with another aspect of the disclosure, the ratio between the first and second clock frequencies may be dynamically controlled based on a variable condition.

For example, the ratio between the first and second clock frequencies may be dynamically controlled based on an input signal of a switching regulator supplied with the second clock signal.

Alternatively, the ratio between the first and second clock frequencies may be dynamically controlled based on an output signal of a switching regulator supplied with the second clock signal.

Further, the ratio between the first and second clock frequencies may be dynamically controlled based on heating conditions.

In accordance with an exemplary embodiment, the first clock frequency may be set externally with respect to the power supply system.

Alternatively, the first clock frequency may be set internally by the power supply system.

In accordance with a further aspect of the disclosure, the first clock circuit may be configured for providing an adjustable phase difference between the first clock signal supplied to one of the first and second switching regulators, and the first clock signal supplied to the second clock circuit.

In accordance with another aspect of the disclosure, a system having multiple switching regulator channels for producing respective output signals in response to respective input signals may comprise a first clock circuit for supplying a first clock signal to define a switching frequency for at least one of the multiple switching regulator channels, and a second clock circuit for producing a second clock signal based on the first clock signal to define a switching frequency for at least one other switching regulator channel of the multiple switching regulator channels.

In accordance with a method of the disclosure, the following steps may be carried out for providing power supply
  producing a first output signal in response to a first input signal using switching regulation at a first constant switching frequency controlled based on a first clock signal, and
  producing a second output signal in response to a second input signal using switching regulation at a second constant switching frequency controlled based on a second clock signal derived from the first clock signal.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The drawing figures depict concepts by way of example, not by way of limitations. In the figures, like reference numerals refer to the same or similar elements.

DETAILED DISCLOSURE OF THE EMBODIMENTS

The present disclosure will be made with examples of specific multiple channel switching regulator arrangements. It will become apparent, however, that the concepts described herein are applicable to any multiple channel switching regulator system for providing an output voltage or current above, below or equal to the input voltage or current. The regulator system of the present disclosure may include any number of channels connected in any desired configuration. Each channel may have any desired switching regulator topology with synchronous or non-synchronous rectification.

Figure 4:
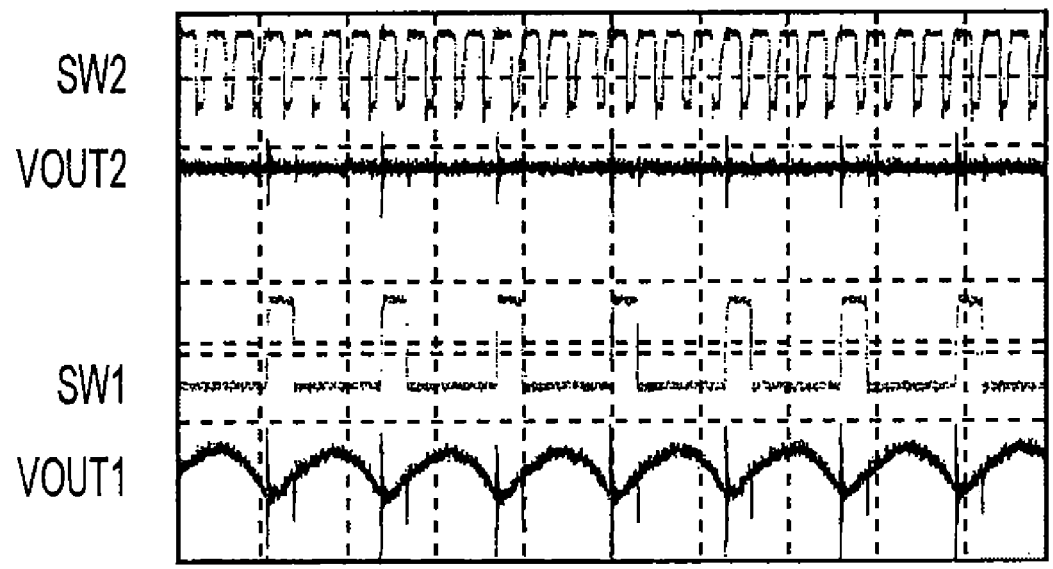
FIG. 4 is a timing diagram illustrating a multiple channel switching regulator system of the present disclosure.

The present disclosure proposes a synchronized multiple channel switching regulator arrangement in which individual switching frequencies can be set for switching regulator channels. For example, FIG. 4 illustrates 750 kHz/3 Mhz synchronized 2-channel switching regulator system of the present disclosure in which switching regulator channel 1 steps 24V to 5V at a 750 kHZ switching frequency, and switching regulator channel 2 steps 5V to 1.8V at a 3 MHz switching frequency. The diagram in FIG. 4 shows switch voltages SW1 and SW2 and output voltages Vout1 and Vout2 for channels 1 and 2, respectively. As is clear from FIG. 4, the increase in switching frequency in the channel 2 compared to the arrangement illustrated in FIG, 3 results in minimizing output voltage ripple amplitude. The synchronized multiple channel system allows a user to optimize external component sizes for each channel by selecting individual switching frequency for the channel. Hence, maximum input to output voltage ratios may be achieved while maintaining constant frequency operation.

Figure 5:
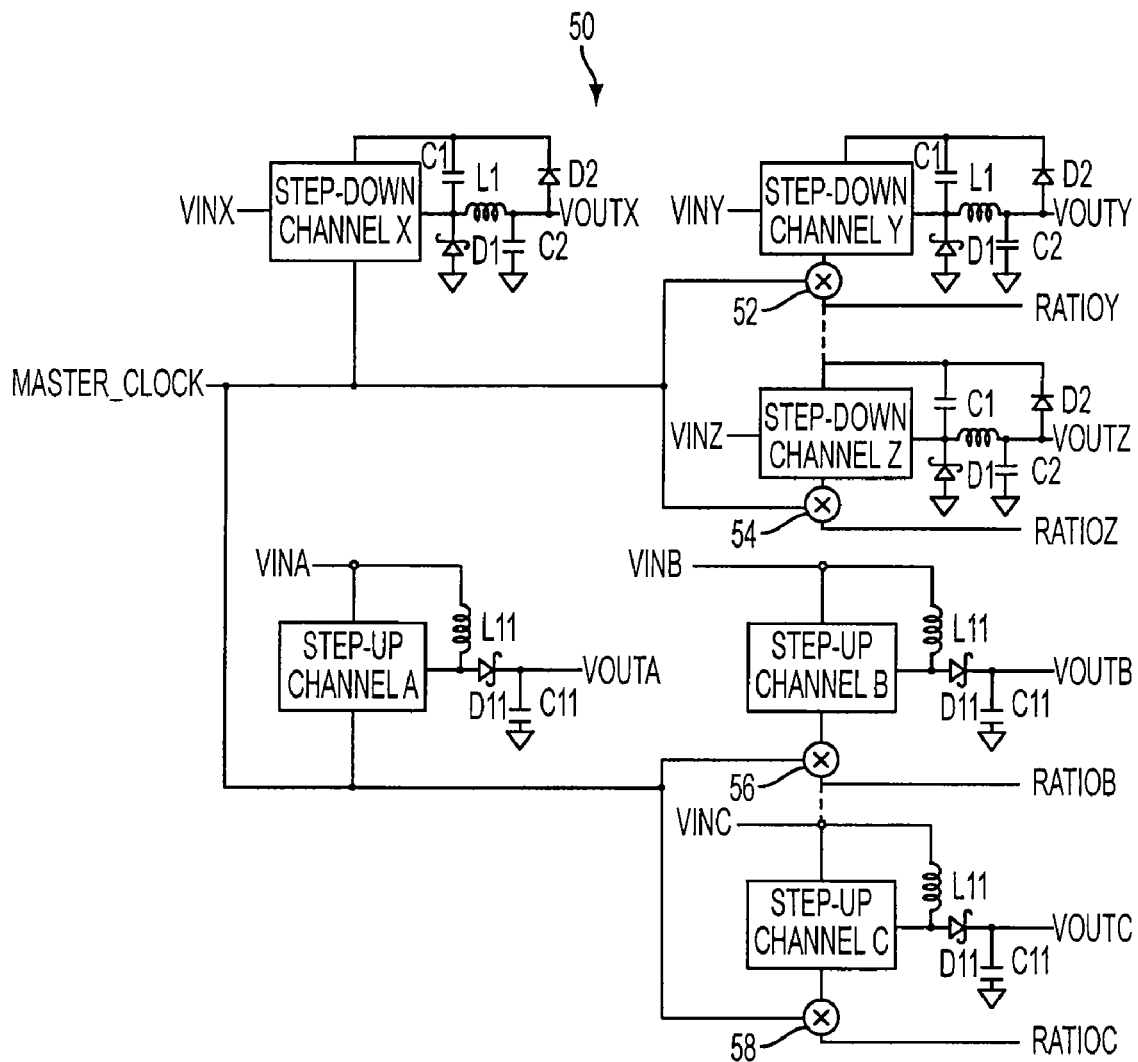
FIG. 5 illustrates a first exemplary embodiment of a multiple channel switching regulator system of the present disclosure.

FIG. 5 illustrates an exemplary embodiment of a synchronized multiple channel switching regulator system 50 of the present disclosure. The system 50 may include any number of step-up and/or step-down switching regulator channels connected in any desired multiple channel configuration. For example, the switching regulator system 50 comprises step-up channels A, B and C respectively supplied with input voltages VINA, VINB and VINC to produce output voltages VOUTA, VOUTB and VOUTC, respectively. Also, the system 50 comprises step-down channels X, Y and Z respectively supplied with input voltages VINX, VINY and VINZ to produce output voltages VOUTX, VOUTY and VOUTZ, respectively.

Figure 1:
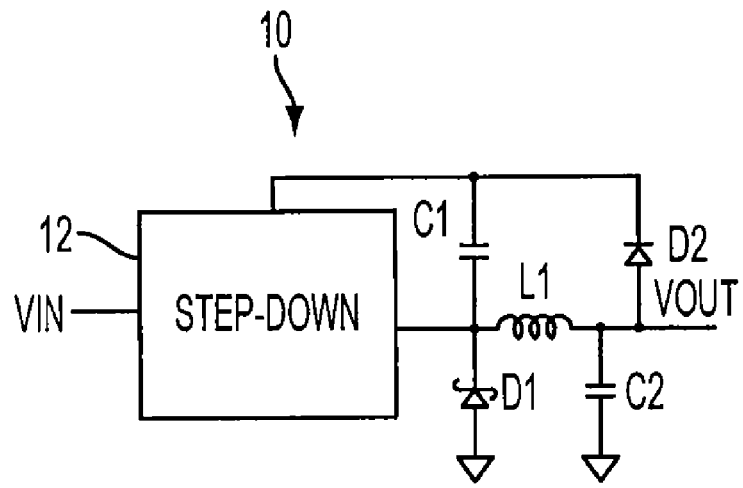
FIG. 1 is a circuit diagram illustrating a conventional topology of a step-down channel in a multiple channel switching regulator system.
Figure 2:
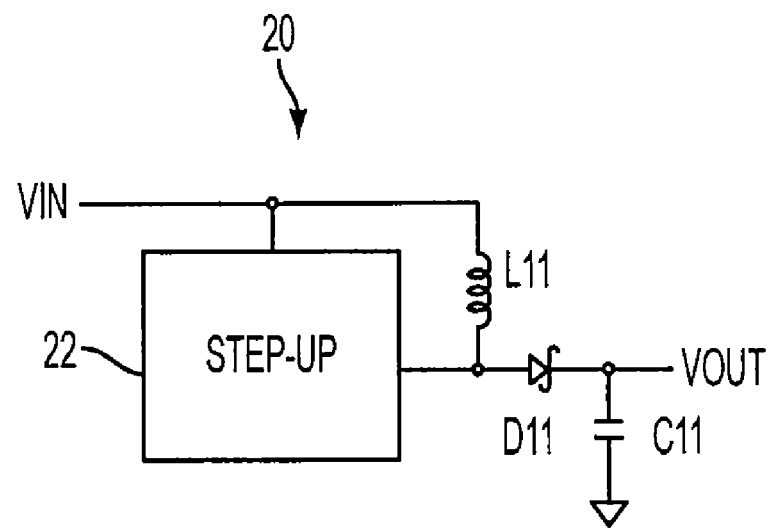
FIG. 2 is a circuit diagram illustrating a conventional topology of a step-up channel in a multiple channel switching regulator system.
Figure 3:
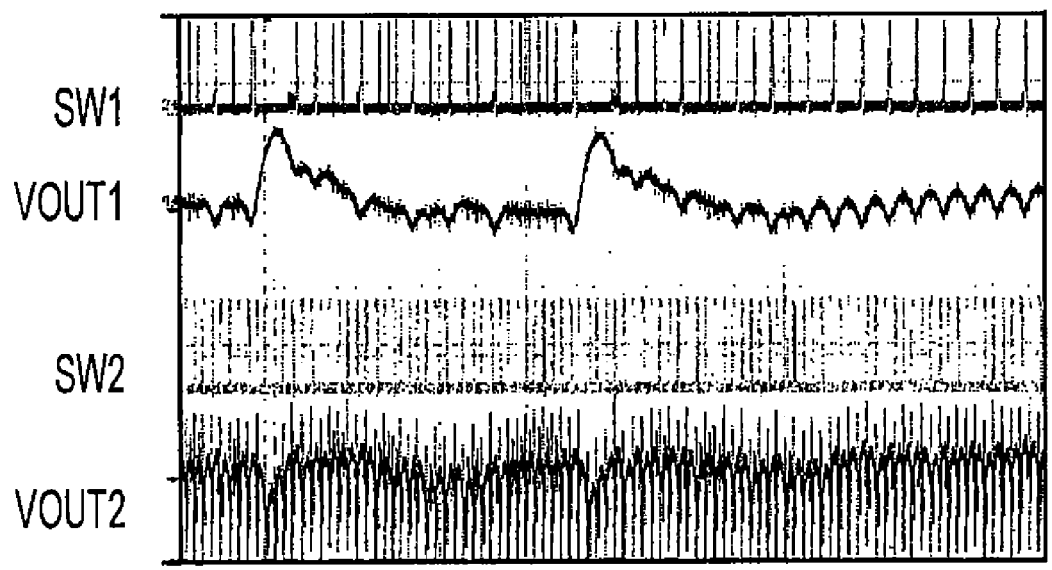
FIG. 3 is a timing diagram illustrating problems in a conventional multiple channel switching regulator system.

Each step-up and step-down channel may have any desired switching regulator topology with synchronous or non-synchronous rectification. For example, each step-down channel X, Y and Z may be configured similarly to the step-down channel 10 in FIG. 1 and may have similar external components including inductor L1, capacitors C1 and C2, and diodes D1 and D2. Each step-up channel A, B and C may be configured similarly to the step-up channel 20 in FIG. 2 and may have similar external components including inductor L11, capacitor C11 and diode D11.

Further, the switching regulator system 50 comprises a clock system including master clock circuitry and channel clock circuitry. The master clock circuitry provides a master clock signal MASTER_CLOCK to supply clock signals to step-up channel A and step-down channel X so as to set the switching frequency for these channels. The frequency of the master clock signal may be set internally within the switching regulator system 50 or externally from a source outside of the switching regulator system 50.

The channel clock circuitry includes frequency multiplier circuits 52, 54, 56 and 58 arranged to produce channel clock signals for channels Y, Z, B and C, respectively. The frequency multipliers 52, 54, 56 and 58 are supplied with the master clock signal MASTER_CLOCK from the master clock circuitry to multiply the frequency of the master clock signal by ratio values RATIOY, RATIOZ, RATIOB and RATIOC established for the respective channels Y, Z, B and C.

The ratio values may be less or more than 1 to produce respective channel clock signals at frequencies lower or higher than the master clock frequency. For example, for step-down channels, the ratio values may be selected to be less than 1 to set switching frequencies of the step-down channels at values less than the master clock frequency. For step-up channels, the ratio values may be higher than 1 to set switching frequencies of the step-up channels at values higher than the master clock frequency.

For example, each ratio value may be set so as to produce a channel switching frequency desired for achieving the maximum input to output ratio for the respective channel while maintaining constant frequency operation of the channel. As discussed in more detail later, the ratio value may be determined based on input or output current or voltage of the channel, based on the temperature of the system die, or based on other considerations such as system design considerations.

The ratio values may be set internally or externally with respect to the switching regulator system 50. Also, the ratio values may be set statically as constant values, or may vary dynamically depending on operating conditions of the regulator 50. To further reduce component size, the phase of each channel clock signal with respect to the master clock signal may be set at a value selected in the range from 0 to 360 degrees.

Figure 6:
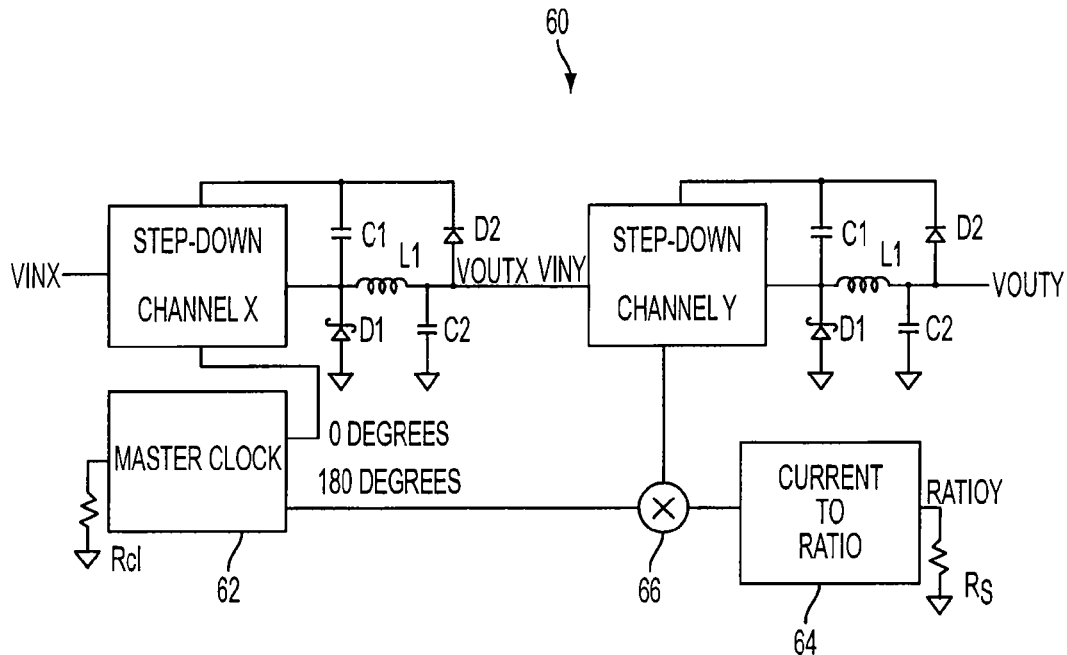
FIG. 6 illustrates a second exemplary embodiment of a multiple channel switching regulator system of the present disclosure.

FIG. 6 illustrates a dual cascaded synchronized step-down switching regulator system 60 in accordance with another exemplary embodiment of the disclosure. The system 60 comprises first step-down channel X supplied with input voltage VINX to produce output voltage VOUTX. Second step-down channel Y is supplied with the output voltage VOUTX of the first step-down channel X to produce the output voltage VOUTY of the regulator system 60. For example, the channel X may convert 24V to 5V, whereas the channel Y may convert 5V to 1.8V.

The step-down channels X and Y may have any desired step-down switching regulator topology. For example, each step-down channel may be configured similarly to the step-down channel 10 in FIG. 1 and may have similar external components including inductor L1, capacitors C1 and C2, and diodes D1 and D2.

Further, the switching regulator system 60 may include master clock circuitry 62 for producing a master clock signal. For example, the frequency of the master clock signal may be set using a clock resistor Rc1 provided externally or internally with respect to the regulator system 60. The master clock circuitry 62 supplies the master clock signal to the step-down channel X to define its switching frequency.

Also, the system 60 may comprise a current to ratio converter circuit 64 that produces a ratio value based on the current set by a current setting resistor Rs provided externally or internally with respect to the regulator system 60. The current may be selected to provide a desired value of the switching frequency for the step-down channel Y.

The ratio value is supplied to a frequency multiplier circuit 66, together with the master clock signal from the master clock circuitry 62. The frequency multiplier circuit 66 multiplies the frequency of the master clock by the ratio value to produce the channel clock frequency for setting the switching frequency of the step-down channel Y. The master clock signal supplied to the frequency multiplier circuit 66 may be shifted in phase with respect to the master clock signal provided to the step-down channel X. For example, the phase shift may be set at 180 degrees.

Figure 7:
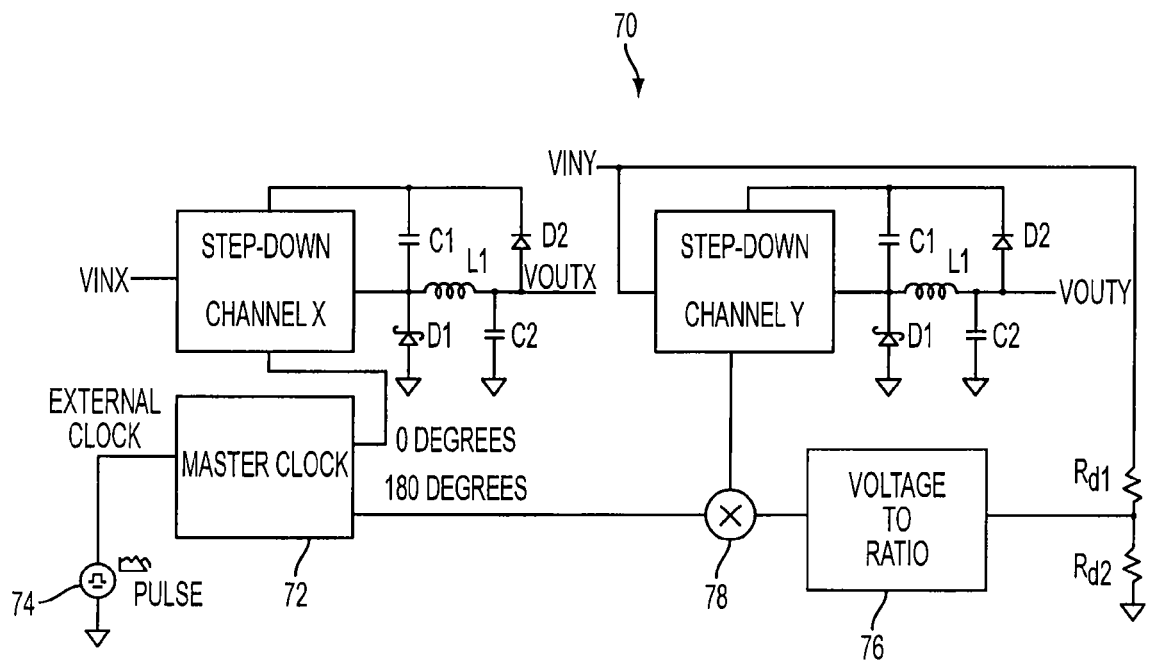
FIG. 7 illustrates a third exemplary embodiment of a multiple channel switching regulator system of the present disclosure.

FIG. 7 illustrates another exemplary embodiment of the present disclosure in which a dual multi-input/output synchronized step-down switching regulator system 70 includes step-down channel X supplied with input voltage VINX to produce output voltage VOUTX, and step-down channel Y supplied with input voltage VINY to produce output voltage VOUTY. The VINX voltage may be independent from the VINY voltage, and the VOUTX voltage may be independent from the VOUTY voltage. The step-down channels X and Y may have any desired step-down switching regulator topology. For example, each step-down channel may be configured similarly to the step-down channel 10 in FIG. 1 and may have similar external components including inductor L1, capacitors C1 and C2, and diodes D1 and D2.

Further, the switching regulator system 70 may include master clock circuitry 72 for producing a master clock signal. For example, the frequency of the master clock signal may be set using an external clock signal produced by a pulse oscillator 74. The master clock circuitry 72 supplies the master clock signal to the step-down channel X to define its switching frequency.

Also, the system 70 may comprise a voltage to ratio converter circuit 76 that produces a ratio value based on the input voltage VINY. A voltage divider composed of resistors Rd1 and Rd2 may be arranged to supply the circuit 76 with an appropriate voltage value representing VINY.

The ratio value is supplied to a frequency multiplier circuit 78, together with the master clock signal from the master clock circuitry 72. The frequency multiplier circuit 78 multiplies the frequency of the master clock by the ratio value to produce the channel clock frequency for setting the switching frequency of the step-down channel Y. The master clock signal supplied to the frequency multiplier circuit 78 may be shifted in phase with respect to the master clock signal provided to the step-down channel X. For example, the phase shift may be set at 180 degrees.

Figure 8:
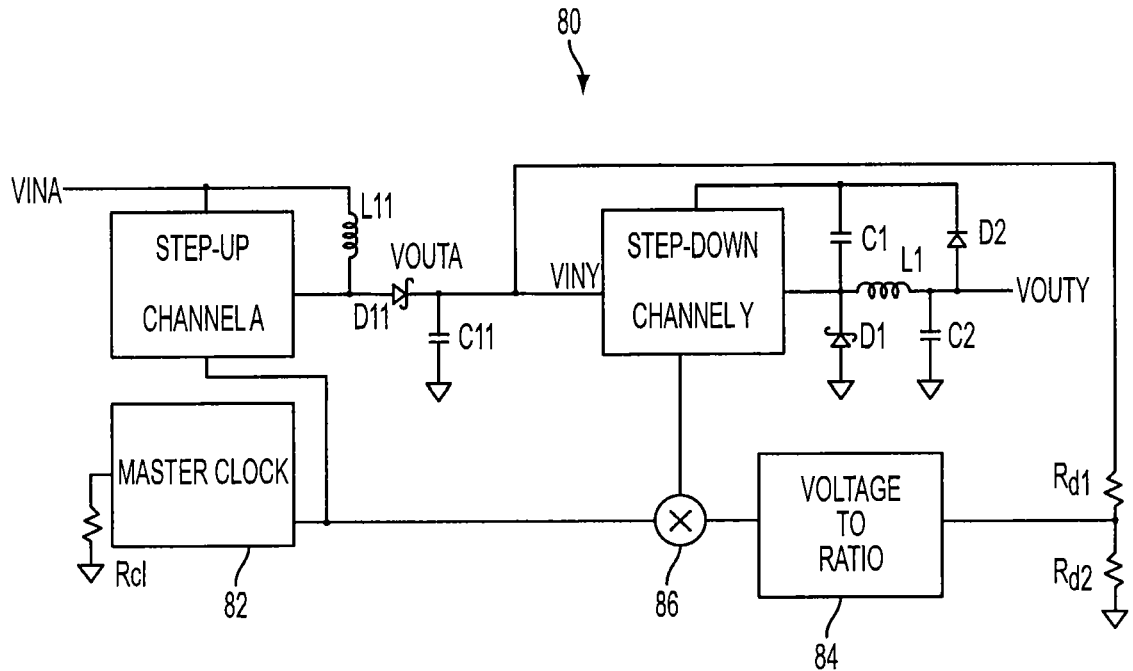
FIG. 8 illustrates a fourth exemplary embodiment of a multiple channel switching regulator system of the present disclosure.

FIG. 8 shows a further exemplary embodiment of the present disclosure in which a two-stage synchronized step-up/step-down switching regulator system 80 comprises a step-up channel A supplied with input voltage VINA to produce output voltage VOUTA, and a step-down channel Y having the input connected to the output of the step-up channel A to produce output voltage VOUTY. The step-up channel A and step-down channel Y may have any desired switching regulator topology. For example, the step-down channel Y may be configured similarly to the step-down channel 10 in FIG. 1 and may have similar external components including inductor L1, capacitors C1 and C2, and diodes D1 and D2. The step-up channel A may be configured similarly to the step-up channel 20 in FIG. 2 and may have similar external components including inductor L11, capacitor C11 and diode D11.

Further, the switching regulator system 80 may include master clock circuitry 82 for producing a master clock signal. For example, the frequency of the master clock signal may be set using a clock resistor Rc1 provided externally or internally with respect to the regulator system 80. The master clock circuitry 82 supplies the master clock signal to the step-up channel A to define its switching frequency.

Also, the system 80 may comprise a voltage to ratio converter circuit 84 that produces a ratio value based on the input voltage VINY of the step-down channel Y. A voltage divider composed of resistors Rd1 and Rd2 may be arranged to provide the circuit 84 with an appropriate voltage value representing VINY.

The ratio value is supplied to a frequency multiplier circuit 86, together with the master clock signal from the master clock circuitry 82. The frequency multiplier circuit 86 multiplies the frequency of the master clock by the ratio value to produce the channel clock frequency for setting the switching frequency of the step-down channel Y. The master clock signal to the frequency multiplier circuit 86 may be provided in phase with respect to the master clock signal provided to the step-down channel A.

Figure 9:
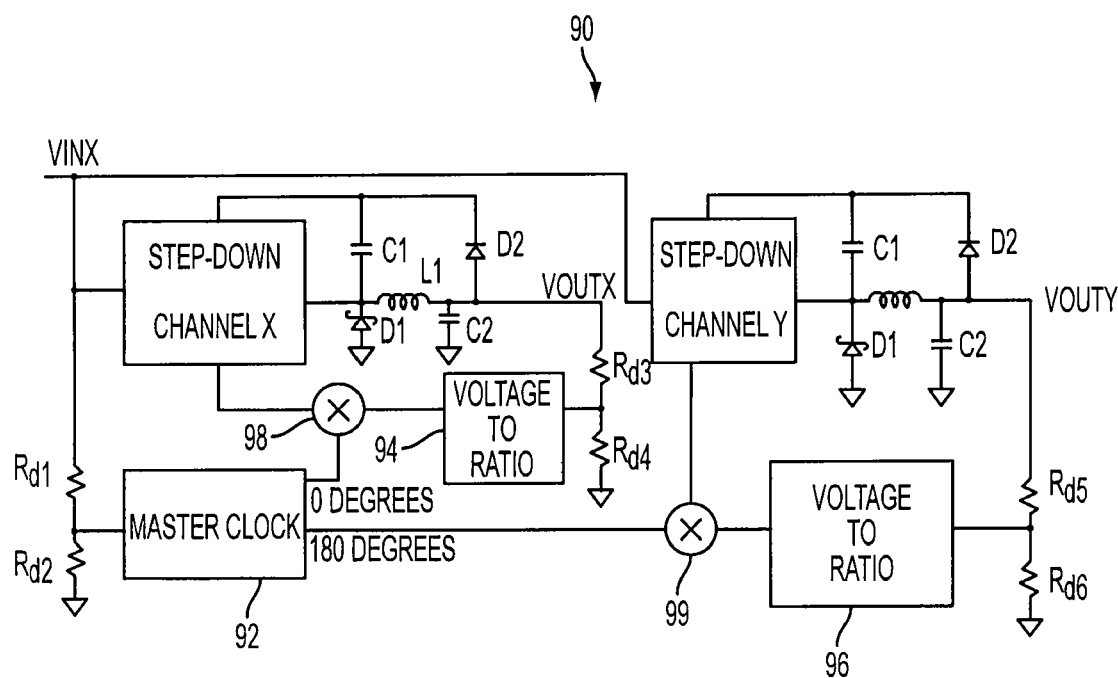
FIG. 9 illustrates a fifth exemplary embodiment of a multiple channel switching regulator system of the present disclosure.

FIG. 9 illustrates a further exemplary embodiment of the present disclosure in which a dual synchronized step-down switching regulator system 90 comprises step-down channels X and Y supplied with a common input voltage VINX. The step-down channel X produces output voltage VOUTX, whereas the step-down channel Y produces output voltage VOUTY. The step-down channels X and Y may have any desired step-down switching regulator topology. For example, each step-down channel may be configured similarly to the step-down channel 10 in FIG. 1 and may have similar external components including inductor L1, capacitors C1 and C2, and diodes D1 and D2.

Further, the switching regulator system 90 may include master clock circuitry 92 for producing a master clock signal. The frequency of the master clock may be set based on the input voltage VINX. A voltage divider composed of resistors Rd1 and Rd2 may be used to provide to the master clock circuitry 92 an appropriate voltage value representing VINX.

Voltage to ratio converter circuits 94 and 96 are respectively arranged for producing ratio values for step-down channels X and Y. The voltage to ratio converter circuit 94 provides the ratio value based on the output voltage VOUTX, whereas the voltage to ratio converter circuit 96 provides the ratio value based on the output voltage VOUTY. A voltage divider composed of resistors Rd3 and Rd4 may be arranged to provide an appropriate voltage value representing VOUTX, and a voltage divider composed of resistors Rd5 and Rd6 may be arranged to provide an appropriate voltage value representing VOUTY.

The ratio value provided by the circuit 94 is supplied to a frequency multiplier circuit 98, together with the master clock signal from the master clock circuitry 92. The frequency multiplier circuit 98 multiplies the frequency of the master clock by the ratio value to produce the channel clock frequency for setting the switching frequency of the step-down channel X.

The ratio value provided by the circuit 96 is supplied to a frequency multiplier circuit 99, together with the master clock signal from the master clock circuitry 92. The frequency multiplier circuit 99 multiplies the frequency of the master clock by the ratio value to produce the channel clock frequency for setting the switching frequency of the step-down channel Y.

The master clock signal supplied to the frequency multiplier circuit 98 may be shifted in phase with respect to the master clock signal provided to the frequency multiplier circuit 99. For example, the phase shift may be set at 180 degrees.

Figure 10:
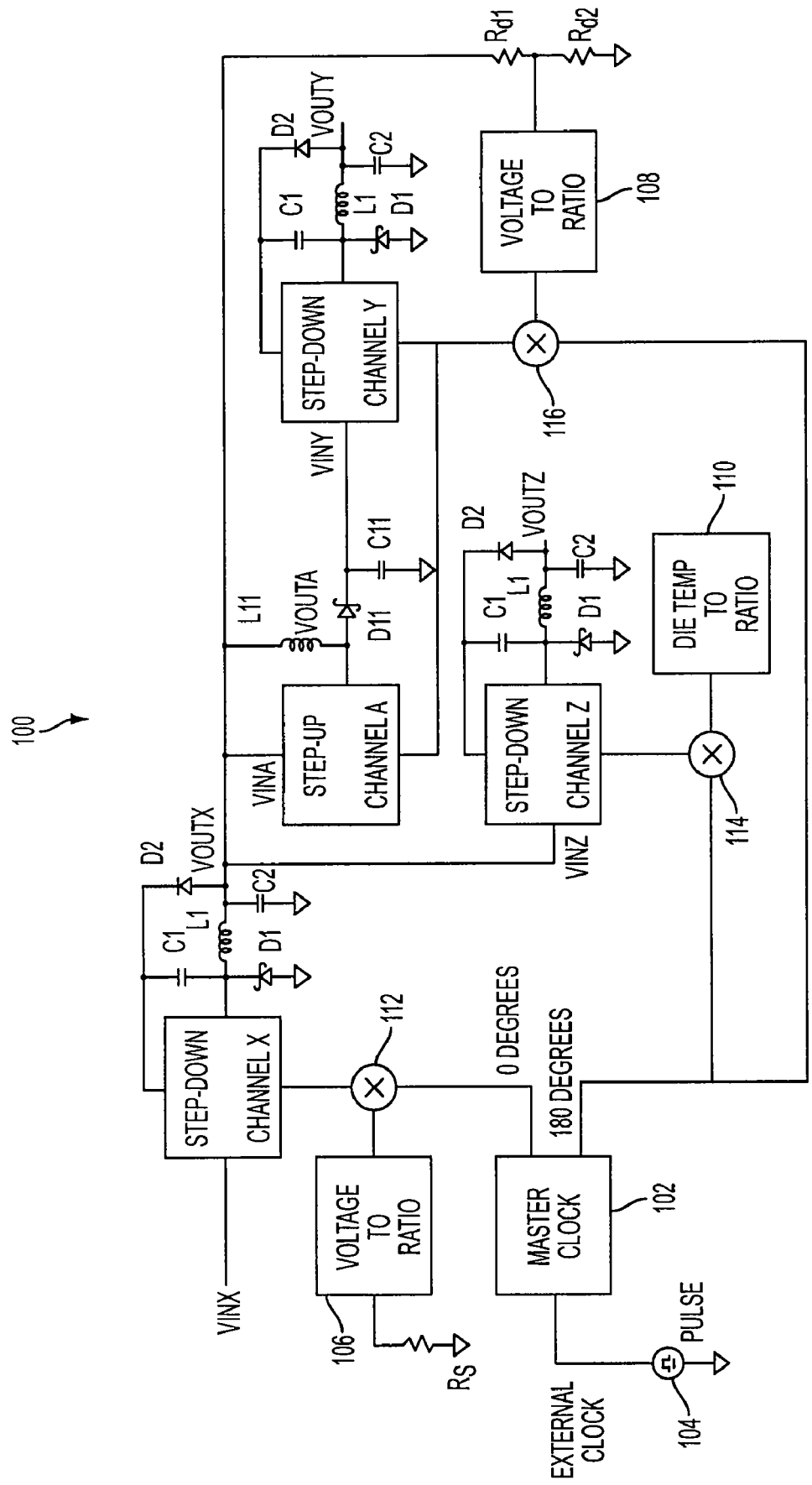
FIG. 10 illustrates a sixth exemplary embodiment of a multiple channel switching regulator system of the present disclosure.

FIG. 10 illustrates another exemplary embodiment of the present disclosure in which a synchronized multiple channel switching regulator system 100 comprises step-down channels X, Y and Z, and a step-up channel A. The step-down channel X is responsive to an input voltage VINX of the system 100 for producing output voltage VOUTX supplied to input VINA of the step-up channel A and input VINZ of the step-down channel Z. The output voltage VOUTA produced by the step-up channel A is supplied to input VINY of the step-down channel Y that produces output voltage VOUTY. The step-down channel Z is responsive to VOUTX for producing output voltage VOUTZ.

The step-up channel A and step-down channels X, Y and Z may have any desired switching regulator topology. For example, the step-down channels X, Y and Z may be configured similarly to the step-down channel 10 in FIG. 1 and may have similar external components including inductor L1, capacitors C1 and C2, and diodes D1 and D2. The step-up channel A may be configured similarly to the step-up channel 20 in FIG. 2 and may have similar external components including inductor L11, capacitor C11 and diode D11.

Further, the switching regulator system 100 may include master clock circuitry 102 for producing a master clock signal. For example, the frequency of the master clock signal may be set using an external clock signal produced by a pulse oscillator 104.

The system 100 includes a voltage to ratio converter circuit 106 that produces a ratio value for the step-down channel X, a voltage to ratio converter circuit 108 that provides a ratio value for the step-down channel Y and step-up channel A, and a die temperature to ratio converter circuit 110 that produces a ratio value for the step-down channel Z.

The voltage to ratio converter circuit 106 produces the ratio value statically based on a pre-set voltage value provided using a voltage setting resistor Rs. The voltage to ratio converter circuit 108 produces the ratio value dynamically based on the input voltage VINA of the step-up channel A. A voltage divider composed of resistors Rd1 and Rd2 may be provided for supplying the voltage VINA to the circuit 108.

The die temperature to ratio converter circuit 110 provides the ratio value dynamically based on the die temperature of the regulator system chip. For example, to support the step down channel Z, the ratio value may decrease when the die temperature increases.

Frequency multiplier circuits 112, 114 and 116 are arranged to multiply the frequency of the master clock signal by the respective ratio values to produce respective channel clock frequencies. In particular, the frequency multiplier circuit 112 multiplies the master clock frequency by the ratio value produced by the voltage to ratio converter circuit 106 to provide the channel clock frequency for setting the switching frequency of the step-down channel X. The frequency multiplier circuit 114 multiplies the master clock frequency by the ratio value produced by the die temperature to ratio converter circuit 110 to provide the channel clock frequency for setting the switching frequency of the step-down channel Z. The frequency multiplier circuit 114 multiplies the master clock frequency by the ratio value produced by the voltage to ratio converter circuit 108 to provide the channel clock frequency for setting the switching frequencies of the step-down channel Y and step-up channel A.

The master clock signal supplied to the frequency multiplier 112 may be shifted in phase, e.g. by 180 degrees, with respect to the master clock signals provided to multipliers 114 and 116. The master clock signal supplied to the frequency multiplier 114 may coincide in phase with the master clock signal provided to the frequency multiplier 116.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A power supply system having first and second switching regulators, and comprising:
   a first clock circuit for supplying a first clock signal having a first clock frequency to define a switching frequency of one of the first and second switching regulators, and
   a second clock circuit synchronized to the first clock signal for producing a second clock signal having a second clock frequency different from the first clock frequency, to define a switching frequency of the other of the first and second switching regulators.

2. The system of claim 1, wherein the first switching regulator is configured to operate at a constant first switching frequency, and the second switching regulator is configured to operate at a constant second switching frequency different from the first switching frequency.

3. The system of claim 1, further comprising:
   a third switching regulator for producing a third output signal in response to a third input signal, and
   a third clock circuit responsive to the first clock signal for producing a third clock frequency different from the first clock frequency, to define a switching frequency of the third switching regulator.

4. The system of claim 1, wherein an output of the first switching regulator is coupled to an input of the second switching regulator.

5. The system of claim 1, wherein the first switching regulator is responsive to a first input signal to produce a first output signal, and the second switching regulator is responsive to a second input signal independent of the first input signal and the first output signal, to produce a second output signal.

6. The system of claim 1, wherein an input of the first switching regulator is coupled to an input of the second switching regulator.

7. The system of claim 1, wherein in response to a first input signal, the first switching regulator produces a first output signal higher than the first input signal, and in response to a second input signal, the second switching regulator produces a second output signal higher than the second input signal.

8. The system of claim 1, wherein in response to a first input signal, the first switching regulator produces a first output signal higher than the first input signal, and in response to a second input signal, the second switching regulator produces a second output signal lower than the second input signal.

9. The system of claim 1, wherein in response to a first input signal, the first switching regulator produces a first output signal lower than the first input signal, and in response to a second input signal, the second switching regulator produces a second output signal lower than the second input signal.

10. The system of claim 1, wherein in response to a first input signal, the first switching regulator produces a first output signal lower than the first input signal, and in response to a second input signal, the second switching regulator produces a second output signal higher than the second input signal.

11. The system of claim 1, wherein a ratio between the first and second clock frequencies is set based on a pre-determined factor.

12. The system of claim 1, wherein a ratio between the first and second clock frequencies is determined based on an input signal of a switching regulator supplied with the second clock signal.

13. The system of claim 1, wherein a ratio between the first and second clock frequencies is determined based on an output signal of a switching regulator supplied with the second clock signal.

14. The system of claim 1, wherein a ratio between the first and second clock frequencies is determined based on heating conditions.

15. The system of claim 1, wherein a ratio between the first and second clock frequencies is dynamically controlled based on a variable condition.

16. The system of claim 1, wherein a ratio between the first and second clock frequencies is dynamically controlled based on an input signal of a switching regulator supplied with the second clock signal.

17. The system of claim 1, wherein a ratio between the first and second clock frequencies is dynamically controlled based on an output signal of a switching regulator supplied with the second clock signal.

18. The system of claim 1, wherein a ratio between the first and second clock frequencies is dynamically controlled based on heating conditions.

19. The system of claim 1, wherein the first clock frequency is set externally with respect to the power supply system.

20. The system of claim 1, wherein the first clock frequency is set by the power supply system.

21. The system of claim 1, wherein the first clock circuit is configured for providing an adjustable phase difference between the first clock signal supplied to one of the first and second switching regulators, and the first clock signal supplied to the second clock circuit.

22. A system having multiple switching regulator channels for producing respective output signals in response to respective input signals, comprising:
   a first clock circuit for supplying a first clock signal to define a switching frequency of at least one of the multiple switching regulator channels, and
   a second clock circuit for producing a second clock signal synchronized to the first clock signal to define a switching frequency of at least one another switching regulator channel of the multiple switching regulator channels, the second clock signal having a frequency different from a frequency of the first clock signal.

23. A method of power supply comprising the steps of:
   producing a first output signal synchronized to a first input signal using switching regulation at a first switching frequency controlled based on a first clock signal, and
   producing a second output signal in response to a second input signal using switching regulation at a second switching frequency controlled based on a second clock signal derived from the first clock signal, the second clock signal having a frequency different from a frequency of the first clock signal, and the second switching frequency being different from the first switching frequency.

* * * * *